United States Patent [19]
Yoshida

[11] 4,255,498
[45] Mar. 10, 1981

[54] BUTTON-TYPE AIR CELL
[75] Inventor: Kazumasa Yoshida, Yokohama, Japan
[73] Assignee: Toshiba Ray-O-Vac Co., Ltd., Tokyo, Japan
[21] Appl. No.: 88,620
[22] Filed: Oct. 26, 1979
[51] Int. Cl.$^3$ .......................................... H01M 12/06
[52] U.S. Cl. .......................................... 429/27; 429/43
[58] Field of Search ............... 429/27, 43; 252/431 N
[56] References Cited

U.S. PATENT DOCUMENTS

| | | | |
|---|---|---|---|
| 3,410,727 | 11/1968 | Jasinski | 429/43 |
| 3,585,079 | 6/1971 | Richter et al. | 429/43 |
| 3,658,721 | 4/1972 | Tamaru | 252/431 N |
| 3,746,580 | 7/1973 | Aker et al. | 429/27 |
| 4,105,830 | 8/1978 | Kordesch | 429/27 |

FOREIGN PATENT DOCUMENTS 2549083  5/1977  Fed. Rep. of Germany ............ 429/43

OTHER PUBLICATIONS

Bagotzky et al., Electrocatalysis of the Oxygen Reduction Process on Metal Chelates in Acid Electrolyte Journal of Power Sources, 2 (1977/1978), 233–240, printed in the Netherlands.

*Primary Examiner*—Donald L. Walton
*Attorney, Agent, or Firm*—Frishauf, Holtz, Goodman & Woodward

[57] ABSTRACT

A button-type air cell which comprises:
an air cathode prepared by adding a binder to carbon powders mixed with metal chelates;
viscous gelled electrolyte set in contact with said air cathode;
and wherein the metal chelates include metal phthalocyanines and metal porphyrins; and the metal atom of the metal chelates is symmetrically surrounded by four nitrogen atoms, said metal being cobalt, iron, nickel, manganese or copper.

11 Claims, 1 Drawing Figure

U.S. Patent
Mar. 10, 1981
4,255,498
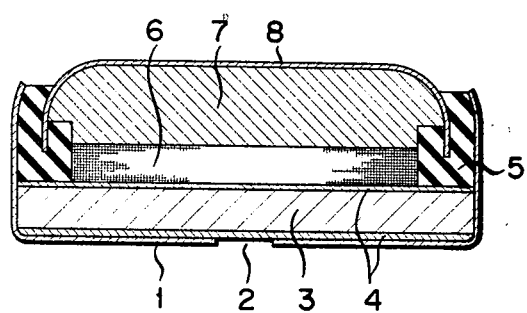

BUTTON-TYPE AIR CELL

BACKGROUND OF THE INVENTION

This invention relates to improvements on a button-type air cell, and more particularly to improvements on an air cathode.

The prior art air cell comprises liquid electrolyte and an air cathode prepared by mixing powdered or granular active carbon particles with a water-repellent binder such as powder of Teflon and compressing the mixture into a thin sheet while being carried by a conductive holder such as a nickel net.

The conventional air cell of the above-mentioned type had the drawbacks that the electrolyte pervaded the air cathode due to capillarity during long storage or long period discharge at an extremely small current to thickly cover the surface of the active carbon particles used as one component of the air cathode, thereby prominently decreasing the surface area of the active carbon which could be contacted by air with a decline in the oxygen-reducing power, discharge area and consequently discharge voltage.

The known process of eliminating the above-mentioned difficulties is to add a catalyst such as silver, palladium or platinum to the components of the air cathode, thereby sustaining the oxygen-reducing power of the air cell. However, any of these catalysts is expensive and has to be applied in a large amount, resulting in the high cost of an air cell produced.

SUMMARY OF THE INVENTION

It is accordingly the object of this invention to provide an inexpensive button-type air cell which can preserve good properties even during long storage or long period discharge at an extremely low amperage of current.

To attain the above-mentioned object, this invention provides a button-type air cell which comprises:

an air cathode prepared by mixing carbon powder with metal chelates, and adding a binder to the mixture; and a viscous gelled electrolyte set in contact with the air cathode.

The metal chelates include metal phthalocyanines and metal porphyrins. The metal atoms of these compounds are each symmetrically surrounded by four nitrogen atoms. The metal includes cobalt, iron, nickel, manganese and copper. Th metal chelate is preferred to be the type in which the metal phthalocyanines or metal porphyrins contain 1 to 4 sulfonic radicals ($-SO_3H$) or 1 to 4 radicals of the different forms obtained by substituting the hydrogen of said sulfonic group by Na, K, Li or $NH_4$.

BRIEF DESCRIPTION OF THE DRAWING

The accompanying drawing is a sectional view of a button-type air cell embodying this invention.

DETAILED DESCRIPTION OF THE PREFERRED EMBODIMENT

There will now be described by reference to the accompanying drawing a button-type air cell embodying this invention. Reference numeral 1 denotes a cathode can which concurrently acts as a cathode terminal, and whose bottom is provided with an air inlet 2. Reference numeral 3 shows an air cathode, which touches the bottom of the cathode can 1, and both lateral sides of which are supported by an electrically conducting porous reinforcement member 4 such as a stainless steel net. Further, a gasket 5 is tightly pressed against the periphery of said air cathode 3. Reference numeral 6 denotes an electrolyte-holding layer impregnated with gelled electrolyte of caustic alkali having a viscosity of 10,000 centipoises. The layer 6 is an unwoven fabric or porous material having a high holding capacity and prominent resistance to electrolyte. The layer 6 is disposed between an anode 7 prepared from zinc and air cathode 3. Reference numberal 8 shows an anode can concurrently acting as the anode terminal. This anode can 8 seals an air cell by being bent across the opening of the cathode can 1 with the bent end portions securely held by the gasket 5.

The air cathode 3 is prepared in the following manner. First, powdered or granular active carbon particles are provided which have a total surface area of 800 $m^2/g$ as measured by the gas adsorption method. Next, there is provided a solution prepared by dissolving 2 g of cobalt phthalocyanine in 300 g of quinoline used as a solvent. The active carbon particles are fully dipped in this solution. The carbon particles still retaining the solution are dried in vacuum at a temperature of 100° C. to evaporate the solvent quinoline whereby the cobalt phthalocyanine is crystallized out of the solvent on to the surface of the active carbon particles. The active carbon particles to which the cobalt phthalocyanine is now adsorbed are taken out of the solution to be dried. The above-mentioned operation cycle is repeated as often as required to crystallize out about 5% by weight of cobalt phthalocyanine on the basis of the total weight of the active carbon particles. About 5% by weight of said crystallized cobalt phthalocyanine is mixed with 15% by weight of fine powders of Teflon. The mixture is pressed into a thin sheet while being held in a stainless steel net. Last, the thin sheet is treated with an emulsion of Teflon to be rendered water-repellent, thereby producing the air cathode 3.

Unlike catalysts containing a precious metal such as silver, palladium or platinum which is a resource of limited quantity, a metal chelate embodying this invention can be easily chemically synthesized by oxidation polymerization of, for example, derivatives of pyrrole ($C_4H_5N$) at a very low cost, and moreover renders the product air cathode prominently capable of reducing oxygen.

The preferred metal chelates used as one component of an air cathode embodying this invention include those whose compositions are expressed by the general structural formulas:

(A) Metal-phthalocyanines

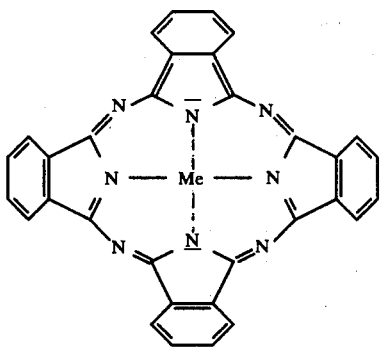

(B) Metal-tetramethoxyphenyl porphyrins

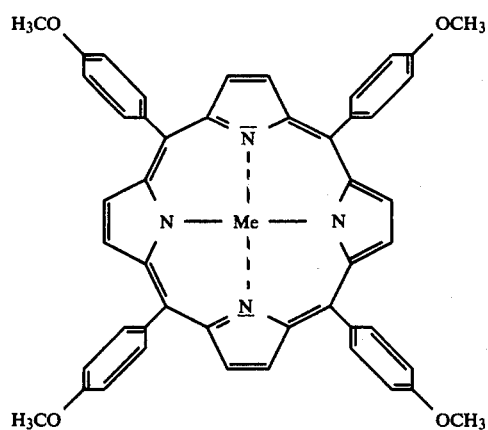

(C) Metal-tetraphenyl porphyrins

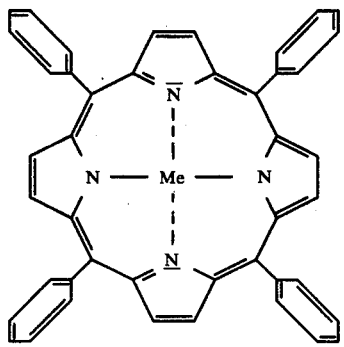

A solvent allowing for the impregnation of metal chelate in active carbon particles may be formed of dimethyl amide, concentrated sulfuric acid, quinoline, dioxane, pyridine or α-chloronaphthalene.

Evaluation was made of the property of samples of an air cathode prepared by impregnating active carbon particles with a metal chelate, heating the mixture in an electric furnace, treating the heated mass with an emulsion of Teflon, and compressing the mass into a thin sheet with both sides of said mass supported by a stainless net. The sample heat treated particularly at a temperature of 150° to 1,300° C. displayed a prominently high catalytic capacity of reducing oxygen. This favorable effect is assumed to result from the fact that when heated 30 minutes at a temperature of 800° C. in an atmosphere of nitrogen, for example, the cobalt tetramethoxy porphyrin ($C_{51}H_{42}O_4N_4Co$) was converted into $C_{47}H_{25}O_4N_4Co$ with a decrease in the number of atoms of C and H, that is, a compound containing highly conjugated double bonds, thereby displaying a stabilized activity. Where, however, heat treatment was carried out at a lower temperature than 150° C., then reaction did not much proceed toward the production of highly conjugated double bonds. As a result, the oxygen-reducing capacity of the metal chelate was not very distinctly noticed. Conversely, where heat treatment was carried out at a higher temperature than 1,300° C., then the metal chelate was considerably scattered due to sublimation, failing to display the desired effect. Where heat treatment was carried out in an atmosphere of an inert gas such as nitrogen or argon, or a reducing gas such as hydrogen or in vacuum, the weight loss of the active carbon particles due to oxidation was effectively reduced. A metal chelate containing 1 to 4 groups or radicals whose composition was expressed as $-SO_3X$ (where X denotes H, Na, K, Li or $NH_4$) was rendered water-soluble. An air cathode prepared by adsorbing a metal chelate dissolved in water to active carbon particles, followed by removal of water and the above-mentioned heat treatment, was shown to indicate a high oxygen-reducing capacity. The air cell of this embodiment was manufactured without applying, for example, a harmful organic solvent, thereby simplifying operation and elevating safety thereof.

The surface of active carbon particles used with the air cathode of this invention is rendered water-repellent. Moreover, this air cathode contains viscous gelled electrolyte. The surface of the active carbon particles is covered with a thin oxygen-permeable layer of electrolyte, thereby broadening a discharge area. Therefore, it is possible to produce from the air cathode of the invention a compact, extremely thin button-type air cell with a high property.

An electrolyte useful for this invention is chosen to have a viscosity ranging from 200 to 20,000 centipoises. An electrolyte having a lower viscosity than 200 centipoises tends to thickly cover the surface of active carbon particles due to capillarity with a considerable decrease in the area of said surface which is exposed to the air and consequently in the oxygen-reducing capacity of the air cathode. Conversely, an electrolyte having a higher viscosity than 20,000 centipoises is readily solidified, resulting to the failure to form a thin layer of electrolyte on the surface of active carbon particles. Since, under this condition, a discharge area is not produced, the discharge property of the air cell drops.

The carbon material used with the air cathode of an air cell embodying this invention may be formed of carbon black, instead of active carbon. It is also possible to reduce the polarization resistance of the air cell by adding a proper amount of graphite for elevation of electric conductivity. Further, the voltage of the air cell can be controlled by adding a proper amount of a material having a nobler potential than oxygen, for example, manganese dioxide ($MnO_2$), nickel oxyhydroxide (NiOOH) or silver oxide ($Ag_2O$ or AgO).

Comparison was made between the property of the air cell of this invention and that of the prior art air cell in the following manner.

30 button-type air cell samples A of this invention were provided, each of which comprised an air cathode containing active carbon powders impregnated with a metal chelate and an electrolyte having a viscosity of 10,000 centipoises and measured 11.5 mm in diameter and 5.2 mm in height. 30 prior art button-type air cell samples B of the same form as described above were also provided, each of which comprised an air cathode containing active carbon particles but free from any of the above mentioned metal chelates embodying this invention, and liquid electrolyte. Both groups of samples were respectively set in an atmosphere maintained at a temperature of 25° C. 10 samples of the respective groups were discharged at a constant amperage of 1.5 mA after six months of storage. 10 samples of the respective groups were discharged at a constant amperage of 1.5 mA after twelve months of storage. Comparison was made between a percentage change in the discharge capacity of the air cell samples of this invention from that of the initial stage, and a percentage change in the discharge capacity of the prior art air cell samples from that of the initial stage, the results being set forth in Table below.

TABLE 1

| Period of storage (at 25° C.) | Change in discharge capacity (%) | |
|---|---|---|
| | 6 months | 12 months |
| Air cells A of this invention | 100 | 98 to 90 |
| Air cells B of the prior art | 80 to 60 | 10 to 0 |

The last batch of 10 samples of the respective groups was discharged for a long period at such an extremely low amperage as 0.1 mA. The current capacity of the air cathode samples of this invention and that of the air cathode samples of the prior art were calculated from the depletion of zinc resulting from chemical reaction, the results being set forth in Table 2 below.

TABLE 2

| | Current capacity (%) |
|---|---|
| Air cell samples A of this invention | 98 |
| Air cell samples B of the prior art | 40 |

Table 1 shows that the air cell samples A of this invention have a prominently great current storage capacity, and, as seen from Table 2, fully allows for a long period discharge at an extremely low amperage.

As mentioned above, an air cell embodying this invention which comprises an air cathode prepared by adding a binder to carbon powders impregnated with a metal chelate and a viscous gelled electrolyte can be manufactured at low cost with a desirable property of withstanding long period storage and allowing for long period discharge at a very low amperage, thus offering prominent industrial advantages.

What is claimed is:

1. An improved button-type air cell comprising an anode, an air cathode, and a viscous gelled electrolyte interposed between and in contact with said anode and said air cathode, the improvement comprising said air cathode comprising a binder containing powdered carbon particles mixed with a metal chelate, said metal chelate being selected from the group consisting of metal phthalocyanines and metal porphyrins wherein the said metal atom is selected from the group consisting of cobalt, iron, nickel, manganese and copper and is symmetrically surrounded by four nitrogen atoms, said metal chelates containing from one to four groups of the formula —$SO_3X$ wherein X is selected from the group consisting of hydrogen, sodium, potassium, lithium and ammonium.

2. The air cell according to claim 1, wherein said metal chelates are metal phthalocyanines.

3. The air cell according to claim 1, wherein said metal chelates are metal porphyrins.

4. The air cell according to claim 1, wherein said air chathode also contains an additive having a nobler potential than oxygen.

5. The air cell according to claim 4, wherein said additive is manganese dioxide, nickel oxyhydroxide or silver oxide.

6. The air cell according to claim 1, wherein the mixture of carbon powders and metal chelates is heat treated at a temperature of 150° to 1,300° C.

7. The air cell according to claim 6, wherein said heat treatment is carried out in an atmosphere of inert gas or reducing gas or in vacuum.

8. The air cell according to claim 7, wherein the electrolyte is chosen to have a viscosity ranging between 200 and 20,000 centipoises.

9. The air cell according to claim 1, wherein the electrolyte is chosen to have a viscosity ranging between 200 and 20,000 centipoises.

10. The air cell according to any one of claims 1, 5, 6, 7, 8 or 9, wherein said metal chelate is cobalt phthalocyanine.

11. The air cell according to any one of claims 1, 5, 6, 7, 8 or 9, wherein said metal chelate is cobalt tetramethoxyphenyl porphyrin or cobalt tetraphenyl porphyrin.

* * * * *